2 Sheets--Sheet 2.
J. W. Webb, Cultivator & Grain Dropper.
No. 120,354.  Patented Oct. 24, 1871.
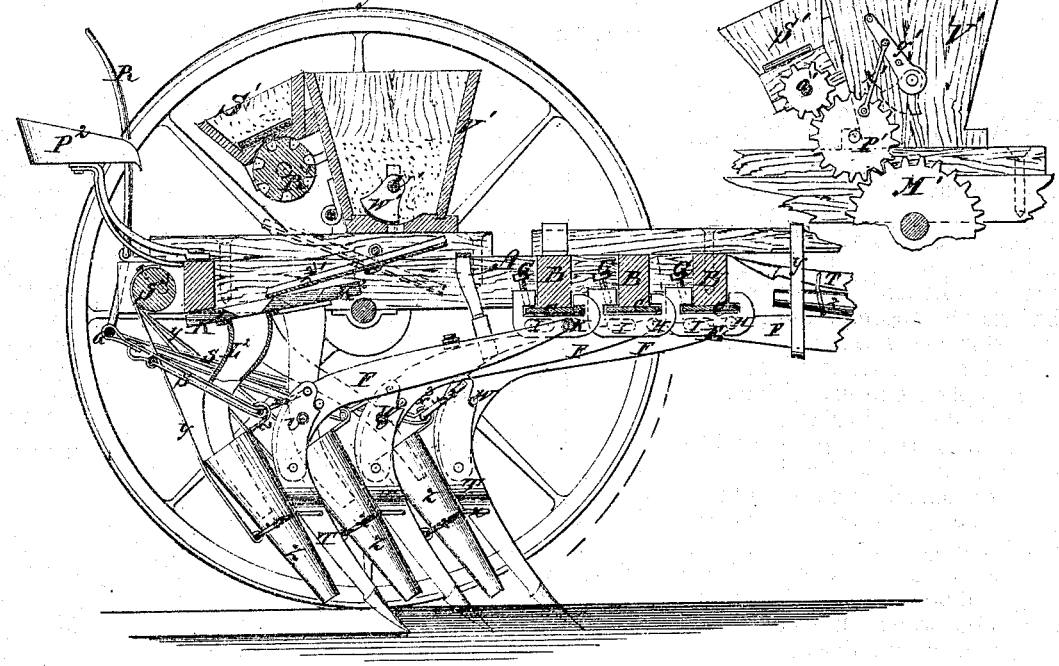
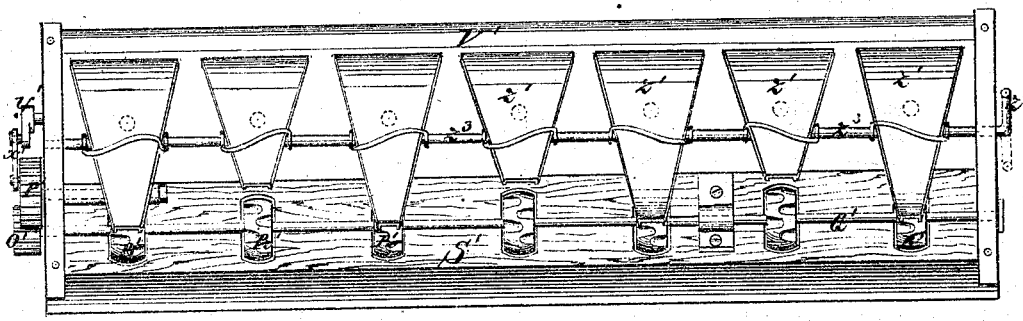
Witnesses:
C. Raettig.
Wm. H. C. Smith.
Inventor:
J. W. Webb.
PER Mumi&Co
Attorneys.

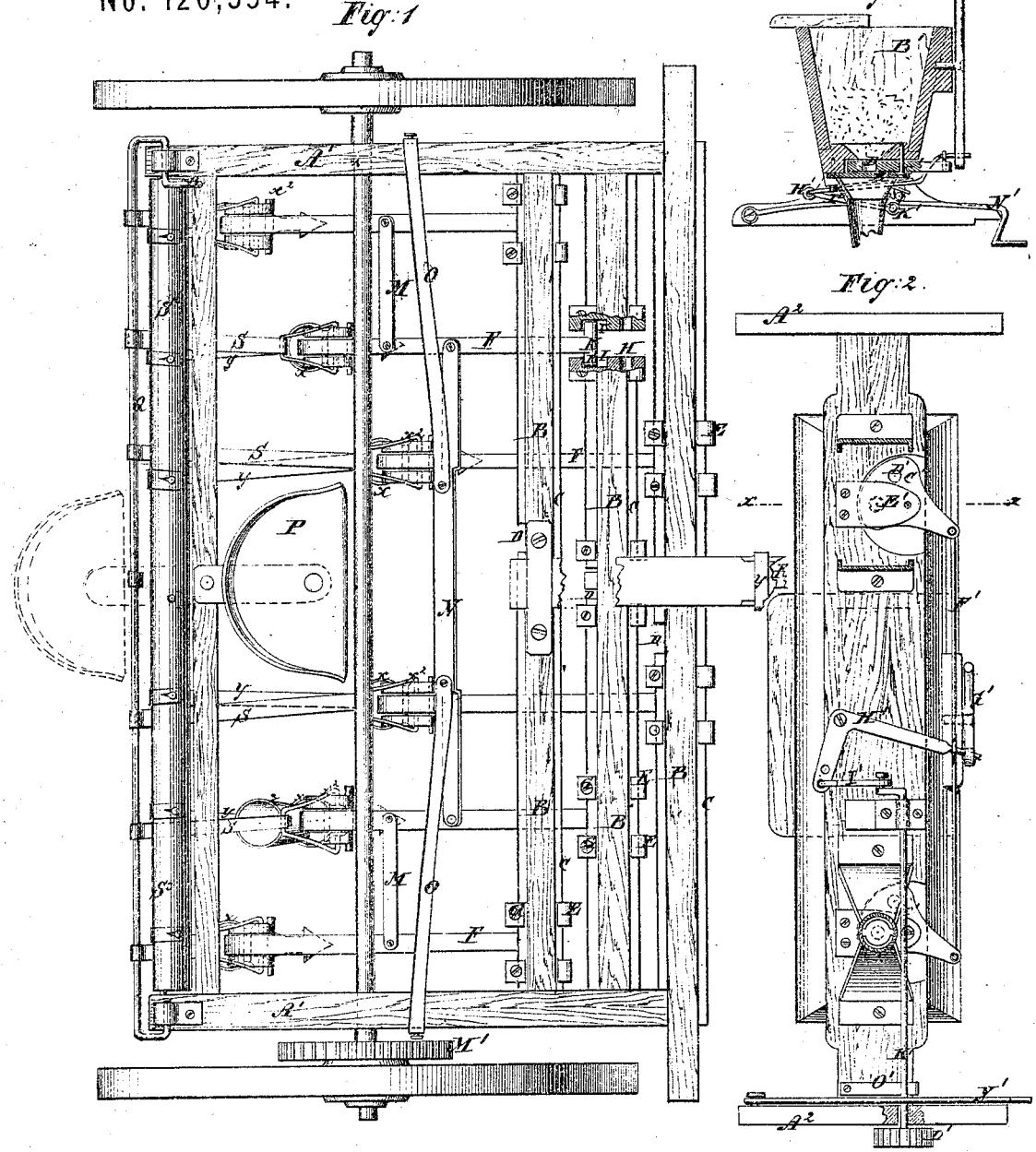

UNITED STATES PATENT OFFICE.

JACOB W. WEBB, OF NEW ATHENS, OHIO.

IMPROVEMENT IN COMBINED SEEDERS AND CULTIVATORS.

Specification forming part of Letters Patent No. 120,354, dated October 24, 1871.

*To all whom it may concern:*

Be it known that I, JACOB W. WEBB, of New Athens, in the county of Harrison and State of Ohio, have invented a new and Improved Cultivator and Seed-Dropper; and I do hereby declare that the following is a full, clear, and exact description thereof, which will enable others skilled in the art to make and use the same, reference being had to the accompanying drawing forming part of this specification.

My invention consists in an improved frame on wheels, adapted to receive either a cultivating, planting, or seed-dropping device, as hereinafter described, and for the purpose specified.

Figure 1 is a plan view of my improved machine as it appears when adjusted for cultivating corn. Fig. 2 is a view of the bottom of the corn-dropping attachment, partly in plan and partly in section. Fig. 3 is a section of Fig. 2 on the line $x\ x$. Fig. 4 is a longitudinal sectional elevation of my improved machine when adjusted for sowing seed either in drills or broadcast. Fig. 5 is a plan of the bottom of the seed-dropping apparatus, and Fig. 6 is an end view of Fig. 5 and part of the frame and section of the shaft.

Similar letters of reference indicate corresponding parts.

The frame A of the machine has three main transverse bars, B, in front, with a bar or plate of iron, C, fastened to the bottom of said bars, the said plates being wider than the bars. The said plates have each a notch, D, in them, so that the hitching-block E, to which the drill-beams F are connected, may be put on and taken off at pleasure, two of the blocks being used to each beam. The said hitching-blocks, when put in their proper positions, are made secure by means of the set-screw G in the rear end of each block, which passes through the upper flange and tightens onto the said plates C, holding the blocks securely in position. Each of the said blocks have both a hole, H, and a slot, I, in them, so that when the journals K on the ends of a beam are put into a slot it will allow the beam or plow to play sidewise, and when put into the holes they will be prevented from lateral play.

In planting corn it is absolutely necessary to have a variation in the direction, for if the drills were rigid any slight variation of the team from the true direction would cause them to tear up the corn; hence this variation is provided for, and it is under the control of the operator. The three drills at each side of the center of the frame form a gang for one side of a row, the two working both sides at once, the one at the center being suspended from the tongue by the strap or chains L; or it may be taken off.

The beams are each attached to the other by means of the short pivoted arms M. Then the two sets of cultivators thus formed on each side of the center are attached to each other by means of the bent bar N attached to the inside beam of each gang, so that when one gang is moved both are moved simultaneously. The straps or chains O, attached to said crooked connecting-bar and side bars of the main frame, are operated by the feet of the plowman by pressing on either of them with the foot, by which both gangs will be moved alike, one strap moving one way and the other the other way. By this means the operator can so guide the cultivator as to avoid turning up the corn or other grain or vegetables, even though the rows may not be straight. P is the driver's seat, which is arranged to answer, by being turned around, for a seat both when the machine is used as a seed-dropper in planting or as a cultivator.

In turning at the end of the row, or in passing around a stump, stone, or other obstruction, the beams are raised up behind by means of the crooked shaft Q and lever R at the rear of the machine, the said shaft being attached to the beams by the straps or chains S. The depth of the drills made is regulated by the straps Y and roller $S^3$, the latter being held in any position by any means and the straps wound on it.

The beams may be made rigid by bolting the upper end of the lever part T to the part F through the hole U. The stop-pin, which is in the upper part F of the beam for the purpose of keeping the beams from bending back, may be made of wood, so that in case the plow should come in contact with anything solid, as, for instance, a large root or stone, the wooden pin will break and let the beam fly back, and will cause no damage but the breaking of the wooden pin. The loops or rings X attached to the parts T of the beams insure the double purpose of eyes to attach the chains or straps Y to for the purpose of raising the beams, and also for keepers or holders for the tubes Z that convey the grain to the ground when the machine is used as a grain-drill, or when it is used as a planter, and they admit of connecting the tubes detachably for removing when not used. The tubes are also further supported by the yokes $X^2$ and hooks $X^3$.

For corn-planting, some of the drills will be taken off and the others arranged in such a manner that one plow will go before each tube of the dropper for which two are used, so as to make a furrow to receive the grain, and another will go behind the tube of the dropper and cover the grain; or two may go behind one which opens the furrow. For dropping the corn when the drills are adjusted as above described the attachment represented in Figs. 2 and 3 is placed on the frame A and secured to the side pieces $A^1$ by bolts or screws passing through the pieces $A^2$. This attachment has two hoppers, B', and an oscillating gate or dropper, C', under each of two discharge-spouts, each gate having two holes, D', receiving the grain over a plate, E, and discharging from one hole at each vibration, at the same time cutting off the escape from the hoppers and bringing the other hole under to be filled. The levers or arms of these gates are connected by a rod, F', and the latter is connected to the short arm of a lever, G', to be operated by the attendant, for vibrating the gates to drop the corn at the will of the attendant, or as the machine crosses the rows or furrows marked in the ground for receiving the corn; but the rod F' may be operated automatically by a bell-crank, H', connecting-rod I', crank-shaft $K^1$, and wheel $L^1$, the latter gearing with a wheel, M', on the axle of the machine. This wheel $L^1$ is raised out of gear with the other by a lever, N', when the gates are to be operated by hand, and it is held in gear by a spring, O'. The wheel $L^1$ is also thrown out of gear when turning corners, and the cultivators are raised out of the ground. The dropping-gates, having two holes, will make two discharges to one revolution of wheel M', which may have two revolutions to one of the driving-wheels, more or less, as preferred. If it be desired to drop once to the revolution of wheel M', then one of the holes of the gates C' may be plugged up.

When it is desired to use the machine as a grain-drill and seed-sower or broadcast-sower the beams are all equipped with their metal tubes Z in the manner shown in Fig. 4; and all the cultivators are adjusted for work with the journal K of their beams in the holes H of the hitching-blocks. Then a conductor, $K^2$, with flexible tubes $L^2$, is made fast to the lower part of the frame, with each of the conducting-tubes $L^2$ entering at their lower ends one of the aforementioned metal tubes Z that are attached to the beams, so that the grain may be conducted to or into the ground. The drilling-and-sowing attachment, Figs. 5 and 6, is now fastened to the frame of the machine instead of the corn-dropper, detached, and in the same manner with the cog-wheel P' thereon gearing into the wheel M' on the axle, and from this motion is communicated to the shaft Q' and feed-wheels R' of the seed-hoppers S', over the discharge-opening of which is a slide, T', to shut off the flow when required, or to regulate the amount discharged. Motion is also communicated, by wheels P', to the shaft v' that runs through the grain-chests V' and carries the vibrating-gates or feeders W' by means of the pitman X', and to the lever y' that is made fast to the said shaft, the pitman being connected to the wheel and lever.

The amount of grain required to be sown or drilled to the acre is regulated by means of the variable connection of the pitman with the lever, which may be shifted toward or from the end of the lever to vary the amount of its movement and the opening of the gates. The grain falls on the transferring-plate $Z^1$ and is carried to the conducting-pipes and deposited in the ground; so when it is desired to make the machine a broadcast-sower the lever $Z^2$ of the shaft $Z^3$, on which the plates $Z^1$ are mounted at the left-hand end of the drill attachment, is thrown forward, throwing the shaft and the transferring-plates forward for scattering the grain in front of the plows so that it will be plowed in.

Either of the grain-hoppers S' and V' may be used alone for grain sowing; but I prefer to arrange them both in one machine, thus enabling me to work either of the two sets of dropping apparatus as best adapted for the kind of grain to be sowed. $P^2$ represents the position of the seat when turned back for applying the corn-dropping or sowing attachment.

Having thus described my invention, I claim as new and desire to secure by Letters Patent—

The wheel-and-axle frame A, three transverse bars, B, notched plates C D, and spur-wheel M', combined, constructed, and arranged to receive at different times the cultivator, drill, and planting mechanism, in the manner described.

JACOB W. WEBB.

Witnesses:
JAMES O. HENDERSON,
FRANK COBBS. (133)